United States Patent Office 3,809,775
Patented May 7, 1974

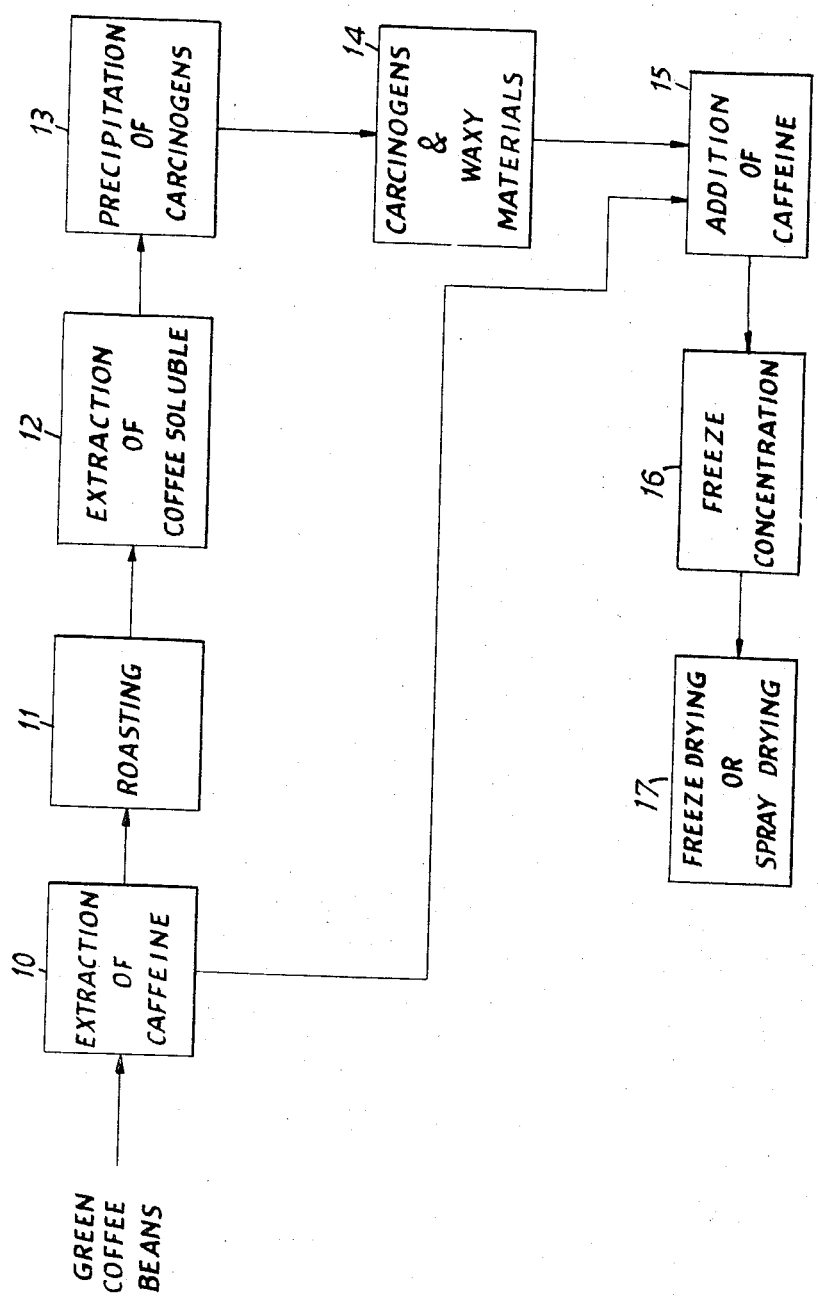

3,809,775
PREPARATION OF COFFEE
Neophytos Ganiaris, Riverdale, N.Y., assignor to Struthers Scientific and International Corporation
Filed July 19, 1972, Ser. No. 273,258
Claims priority, application Great Britain, July 19, 1971, 33,812/71
Int. Cl. A23f 1/04
U.S. Cl. 426—427
3 Claims

ABSTRACT OF THE DISCLOSURE

A process for preparation of liquid extract concentrate is described in which carcinogenic elements are elimiinated by precipitation from a chilled decaffeinated extract solution which is thereafter dried. Caffein is added to the liquid extract before drying and after removal of carcinogenic elements.

---

It is known that compounds such as benzopyrenes and benzofluoranthene are proven carcinogens. Such compounds are formed during roasting of the coffee beans and are insoluble in water.

However, the carcinogens were found in coffee extract. It appears that the presence of caffeine affects the solubility of benzopyrenes and benzofluoranthene in water.

According to the present invention a process for the preparation of soluble coffee extract comprises extracting caffeine from coffee beans, roasting the beans, treating the beans to produce an aqueous extract of coffee, treating the extract to reduce the carcinogen content thereof and adding caffeine to the extract.

When the caffeine has been removed, any carcinogens formed during roasting will not dissolve in the water during extraction. Such compounds might appear in the form of a colloidal suspension in the coffee extract and must be removed. For this purpose we may proceed as follows. The extract is cooled to 30–35° F. and held quiescent at this temperature for a period of one to ten hours, the carcinogens coagulate and precipitate out together with other polymeric substances insoluble in water at this temperature. Subsequently, the precipitate is separated from the extract by centrifugation or filtration.

Caffeine is then added back to the clarified extract. Drying of the extract may be accomplished by spraying or freezing techniques.

The removal of caffeine may be effected according to the process of M. Sivetz, "Coffee Procesing Technology," vol. 2, pp. 209–212, The Avis Publishing Co., Inc., Westport, Connecticut, U.S.A. 1963.

A process in accordance with the present invention is illustrated by way of example in the accompanying drawing which is a flow diagram. Green coffee beans are fed to a caffeine extracting apparatus 10 from which the beans are conveyed to a roasting apparatus 11. From the roasting apparatus 11 the beans are fed to an aqueous extraction plant 12. The aqueous extract passes into a tank 13 where the extract is held at 30 to 35° F. for one to 10 hours. The extract is then treated in a centrifuge 14 to remove carcinogens and other precipitated material. The extract then flows into a tank 15 where the caffeine extracted from the apparatus 10 is added and mixed by rotating mixing blades. The extract then passes on to a freeze concentrating plant 16 and then to a freeze drying or spray drying plant 17.

What is claimed is:
1. A process for the preparation of soluble coffee extract comprising extracting caffeine from coffee beans, roasting the beans, extracting the beans with hot water to produce an aqueous extract of coffee, reducing the benzopyrene and benzofluoranthene carcinogen content of the extract by forming a precipitate therein by cooling and then separating the precipitate with carcinogens from the extract and adding caffeine to the extract.
2. A process as claimed in claim 1 wherein the extract is dried to produce dry granular soluble coffee.
3. A process as claimed in claim 1 wherein the extract is cooled to 30 to 35° F. and held at this temperature for a period of one to ten hours to form a precipitate which is separated by centrifugation or filtration.

References Cited

UNITED STATES PATENTS

| 3,381,302 | 4/1968 | Reimus et al. | 99—71 |
| 3,087,822 | 4/1963 | Smith et al. | 99—71 |

OTHER REFERENCES

Sivetz, Coffee Processing Technology, vol. II, 1963, pp. 208–213.

FRANK W. LUTTER, Primary Examiner
W. L. MENTLIK, Assistant Examiner

U.S. Cl. X.R.
426—444, 472

UNITED STATES PATENT OFFICE
CERTIFICATE OF CORRECTION

Patent No. 3,809,775　　　　　　　　Dated May 7, 1974

Inventor(s) Neophytos Ganiaris

It is certified that error appears in the above-identified patent and that said Letters Patent are hereby corrected as shown below:

Column 1, line 6, after "33,812/71" add --and January 5, 1972, 361/72.--

Signed and sealed this 20th day of May 1975.

(SEAL)
Attest:

RUTH C. MASON
Attesting Officer

C. MARSHALL DANN
Commissioner of Patents
and Trademarks